United States Patent [19]

Ohsawa

[11] 4,199,149
[45] Apr. 22, 1980

[54] RECORD PLAYER

[75] Inventor: Mitsuo Ohsawa, Fujisawa, Japan

[73] Assignee: Sony Corporation, Tokyo, Japan

[21] Appl. No.: 898,778

[22] Filed: Apr. 21, 1978

[30] Foreign Application Priority Data

Apr. 28, 1977 [JP] Japan .................................. 52-49731

[51] Int. Cl.² .............................................. G11B 3/38
[52] U.S. Cl. ................................................. 274/23 A
[58] Field of Search .............. 274/23 A; 318/314, 318

[56] References Cited
U.S. PATENT DOCUMENTS

| | | | |
|---|---|---|---|
| 3,503,615 | 3/1970 | Matsuda | 274/9 RA |
| 3,572,724 | 3/1971 | Rabinow | 274/23 A X |
| 3,883,785 | 5/1975 | Fulcher et al. | 318/318 X |
| 3,974,428 | 10/1976 | Hafle | 318/318 X |
| 4,039,195 | 8/1977 | Iyeta | 274/23 A |
| 4,046,386 | 9/1977 | Gosling | 274/23 A |
| 4,076,257 | 2/1978 | Iyeta | 274/23 A |
| 4,103,281 | 7/1978 | Strom et al. | 318/314 X |
| 4,123,779 | 10/1978 | Goldschmidt | 318/314 X |

FOREIGN PATENT DOCUMENTS 1361610 7/1974 United Kingdom .................. 274/23 A

*Primary Examiner*—Charles E. Phillips
*Attorney, Agent, or Firm*—Lewis H. Eslinger; Alvin Sinderbrand

[57] ABSTRACT

In a record player having a tone arm support moved, as by a rotated screw or other feeding device, in a feeding path that is in parallel, spaced relation to a radius of the turntable so that a pickup stylus depending from the tone arm will move linearly along that radius in tracking the groove of a record disc on the turntable with the tone arm in a predetermined angular relationship to the feeding path, and in which any deviation of the speed of movement of the tone arm support by the feeding device relative to the speed of movement of the stylus by its engagement with the record groove is accompanied by angular displacement of the tone arm from the predetermined angular relationship to the feeding path; a periodic signal has an angular characteristic thereof, such as, the frequency or phase, varied in accordance with detected angular displacements or deviations of the tone arm from the predetermined angular relationship to the feeding path, a reference signal of constant frequency or phase is compared with the periodic signal of varying frequency or phase, respectively, to provide a corresponding control signal, and such control signal varies the speed of movement of the tone arm support by the feeding device in the sense to eliminate the angular displacement or deviation of the tone arm from the predetermined angular relationship.

6 Claims, 7 Drawing Figures

RECORD PLAYER

BACKGROUND OF THE INVENTION

1. Field of the Invention

This invention relates generally to record players, and more particularly is directed to an improved record player in which a reproducing stylus is moved linearly in the radial direction of a record disc when tracking the record groove of the latter.

2. Description of the Prior Art

Most existing record players have a tone arm mounted to swing freely about a vertical axis outside the perimeter of the turntable so that the reproducing stylus of a pickup cartridge mounted at the free end of the tone arm moves in an arcuate path concentric with the swinging axis of the tone arm as the stylus tracks the record groove during reproducing of signals recorded in the latter. The foregoing arrangement has simplicity as an important advantage in that frictional resistance to swinging of the tone arm can be minimized to permit the tracking movement to be effected merely by engagement of the stylus in the spiral record groove of the rotated record disc. However, it has been well recognized that the movement of the stylus in an arcuate path when tracking the record groove is undesireable in that the reaction of the frictional engagement of the stylus with the groove is not consistently directed tangential to the latter, particularly as the stylus moves toward the center of the record disc near the end of a play operation.

Therefore, record players have been developed with so-called linear tracking tone arms in which the pickup or reproducing stylus is intended to move linearly along a radius of the record disc in tracking the groove of the latter as the record disc is rotated on a turntable. However, in the case of a linear tracking tone arm, the engagement of the stylus in the spiral record groove cannot be relied upon to provide a motive force for effecting the actual tracking movement of the tone arm. Thus, in an existing linear tracking tone arm, the latter is mounted on a tone arm support which is moved, as by a rotated feeding screw, in a feeding path that is in parallel, spaced relation to the radius of the turntable along which the pickup stylus is to move. The feeding screw is rotated by means of a servo motor so that the speed of movement of the tone arm support along the rotated feeding screw will approximate the speed of movement of the stylus in the radial direction on the record disc due to the engagement of the stylus with the spiral record groove. Any deviation of the speed of movement of the tone arm support on the rotated feeding screw from the speed of movement of the stylus due to engagement of the latter in the groove of the rotated record disc would cause the stylus to move transversely in respect to the record groove with consequent damage to the stylus or to the record disc. Therefore, the existing linear tracking tone arm is pivotally mounted on the support therefor, with the result that any deviation of the speed of movement of the tone arm support along the rotated feeding screw from the speed of radial movement of the stylus on the record disc is accompanied by angular displacement of the tone arm relative to its support.

In the case of a linear tracking tone arm according to the prior art, angular displacement of the tone arm is detected and a corresponding voltage signal is produced for comparison with a reference voltage to provide a corresponding control signal by which the speed of rotation of the servo motor driving the feeding screw is controlled in the sense to restore the tone arm to its original or predetermined angular relationship to the tone arm support. However, the foregoing control system employing a voltage-comparison cannot achieve the desired high degree of accuracy and requires relatively complex circuit arrangements, such as, the use of a zener diode for generating the reference voltage, in order to compensate for the temperature characteristics of the control system. Furthermore, the described control system cannot be easily provided in the form of integrated circuits and thus cannot take advantage of the cost reductions inherent in such circuits.

In another linear tracking tone arm of the prior art, switch means are mounted adjacent the tone arm so as to be turned ON and OFF in response to angular displacements of the tone arm relative to its support, and the ON and OFF states of the switch means are employed for controlling the operation of the servo motor in the sense to maintain the tone arm in a predetermined angular relationship to the tone arm support. Such arrangement employing switch means for controlling operation of the servo motor is not completely satisfactory in that erroneous operation of the system may result due to chattering of the switch means.

OBJECTS AND SUMMARY OF THE INVENTION

Accordingly, it is an object of this invention to provide an improved record player with a linear tracking tone arm which is free of the previously described disadvantages of the prior art.

More particularly, it is an object of this invention to provide a record player with a linear tracking tone arm in which the movements of such tone arm are reliably and accurately controlled with freedom from chattering by employing a phase-locked loop control system.

Another object is to provide a record player with a linear tracking tone arm, as aforesaid, and in which the control system for the linear tracking is highly responsive to any angular displacement of the tone arm from its predetermined angular relationship of the tone arm support, and the control system has an inherently low susceptiblity to temperature variations as well as being suited for production in the form of an integrated circuit.

A further object is to provide a record player, as aforesaid, in which both the rotational speed of the turntable and the linear tracking of the tone arm are controlled in respect to reference signals from a single reference signal source, thereby simplifying the high-fidelity reproduction of sounds by the record player.

In a record player in accordance with this invention, a tone arm support is moved, as by a rotated feeding screw or other feeding device, in a feeding path that is in parallel, spaced relation to a radius of the turntable so that a pickup stylus depending from the tone arm will move linearly along that radius in tracking the groove of a record disc on the turntable, with the tone arm being angularly displaced from a predetermined angular relationship to the feeding path in response to any deviation of the speed of movement of the tone arm support by the feeding device from the speed of movement of the stylus by its engagement with the record groove, and a tracking control system for the tone arm comprises means for providing a periodic signal having an angular characteristic, such as, its frequency or phase, varied in accordance with detected angular displacements or deviations of the tone arm from its predetermined angular relationship to the feeding path, means for generating a reference signal of constant frequency or phase which is compared with the varying frequency or phase, respectively, of the periodic signal, to provide a corresponding control signal, and means by which such control signal is made to vary the speed of movement of the tone arm support by the feeding device in the sense to eliminate the angular displacement or deviation of the tone arm from the predetermined angular relationship.

The above, and other object, features and advantages of the invention, will be apparent from the following detailed description of illustrative embodiments of the invention which is to be read in connection with the accompanying drawings.

DESCRIPTION OF THE PREFERRED EMBODIMENTS

Figure 1:
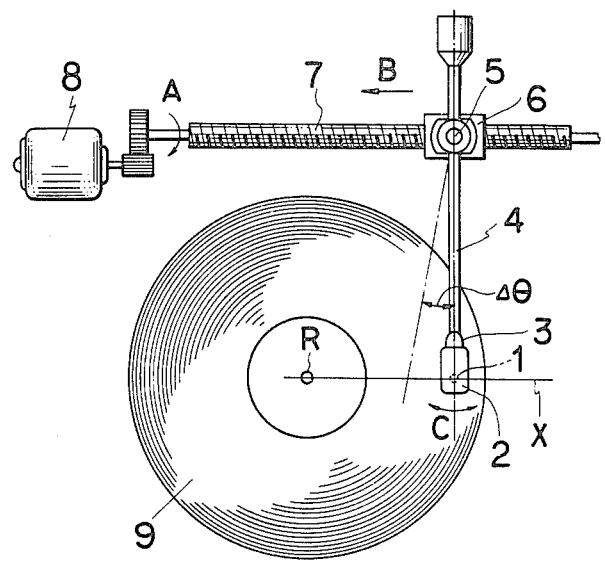
FIG. 1 is a schematic plan view illustrating the basic mechanical components of a record player with a linear tracking tone arm according to the present invention.

Referring to the drawings in detail, and initially to FIG. 1 thereof, it will be seen that, in a record player of a type to which this invention may be applied, a pickup cartridge 2 having a reproducing stylus 1 is mounted, by way of a connector 3, at the free end of a tone arm 4. The tone arm 4 is mounted on a support member 6 by way of a vertical bearing 5 which permits angular displacement or swinging of tone arm 4 in the horizontal direction. The support member 6 has a threaded bore extending horizontally therethrough to receive a feeding screw 7 which is rotated through suitable transmission gears by means of a servo motor 8. The feeding screw 7 is suitably mounted so that it is axially fixed with its longitudinal axis in parallel, spaced relation to a radius X of a record disc 9 which extends from the center R of the record disc through the point of contact of the stylus 1 with the spiral record groove of the disc 9.

It will be apparent that, when feeding screw 7 is rotated, for example, in the direction of the arrow A, tone arm support member 6 is moved in the direction of the arrow B, that is, in a path which is in parallel, spaced relation to the radius X of record disc 9, with the speed of movement of support member 6 being dependent upon the rotational speed of motor 8 and the pitch of feeding screw 7.

If the speed of movement of support member 6 in the direction of the arrow B is exactly equal to the radially inward movement of stylus 1 resulting from engagement of the latter with the spiral record groove of record disc 9 while the latter rotates with the turntable (not shown) supporting the record disc, then tone arm 4 will remain parallel to the position shown in full lines on FIG. 1, that is, in a predetermined angular position or relationship to the path of support member 6 on feeding screw 7, and linear tracking will result. However, if the speed of movement of support member 6 in the direction of the arrow B is not precisely equal to the speed of movement of stylus 1 resulting from engagement with the groove of rotated record disc 9, tone arm 4 is angularly displaced or deviated in one or the other of the directions indicated by the arrows C from its predetermined angular relationship to the path of support member 6.

Figure 2:
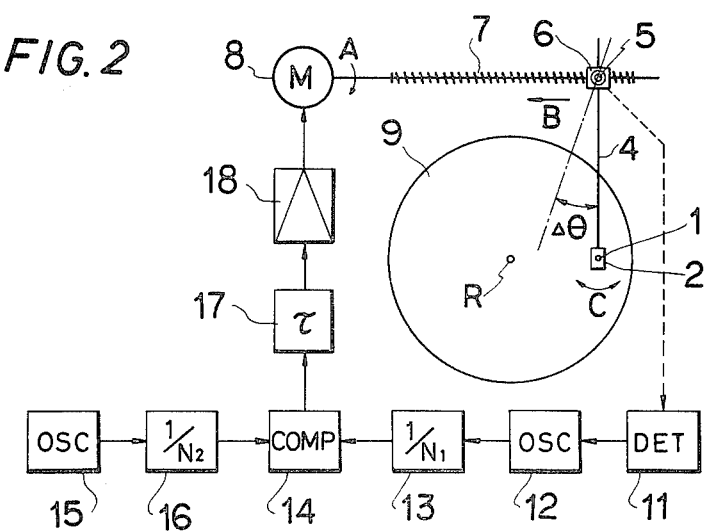
FIG. 2 is a schematic block diagram illustrating a tracking control system for a linear tracking tone arm according to an embodiment of this invention.

Referring now to FIg. 2, it will be seen that a record player as previously described is provided with a control system embodying this invention for regulating the speed and/or direction of operation of servo motor 8 so as to maintain linear tracking by keeping tone arm 4 in its predetermined angular relationship to the path of support member 6. In the control system according to this invention, as shown on FIG. 2, an angle detector 11 is associated with bearing 5 and arm 4 to detect the angular deviation $\Delta\theta$ of tone arm 4 from its predetermined angular relationship, and to provide a corresponding electrical signal which is hereinafter referred to as an angle detection signal. Such angle detection signal is applied from detector 11 to a variable oscillator 12 which produces an oscillation output or periodic signal having an angular characteristic thereof, for example, either its frequency and/or phase, varied in accordance with the angle detection signal. By way of example, when the angle detection signal from angle detector 11 is a signal voltage corresponding in level to the angular deviation or displacement $\Delta\theta$, the oscillator 12 may be a voltage controlled oscillator (VCO) having its oscillation output frequency varied in response to the signal voltage.

The oscillation output from oscillator 12 is applied to a frequency divider 13, and the resulting frequency-divided signal is supplied to one input of a phase comparator 14. Another input of phase comparator 14 receives a reference signal which is obtained by supplying the oscillation output of a reference oscillator 15 having a standardized constant phase and frequency to a frequency divider 16. The comparator 14 compares the signal from frequency divider 13 with the signal from the frequency divider 16, and provides a voltage signal corresponding to the phase or frequency difference thus detected. The voltage signal from phase comparator 14 is supplied to a loop filter 17 which removes any high frequency component or noise therefrom, and the resulting output signal is supplied to a motor drive circuit 18, for example, in the form of an amplifier, which effects the controlled operation of servo motor 8.

Accordingly, there is provided a closed loop control system of the phase locked loop type (PLL) by which, in response to the angular deviation $\Delta\theta$ of tone arm 4 from its predetermined angular relationship to the path of movement of tone arm support 6 in the direction of the arrow B, the speed of rotation of feeding screw 7 in the direction of the arrow A by motor 8 is suitably controlled, that is, increased or decreased, so as to eliminate the angular deviation $\Delta\theta$ and thereby ensure that stylus 1 will be moved linearly along radius X of record disc 9.

Figure 3A:
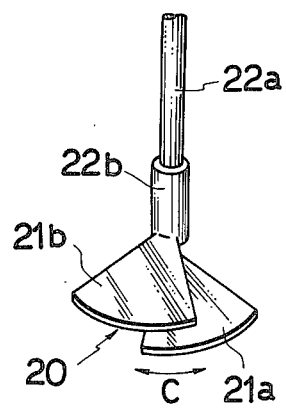
FIG. 3A is a detailed perspective view of a variable capacitor which may be employed as an angle detector in the control system of FIG. 2.
Figure 3B:
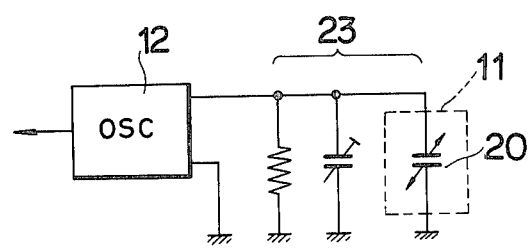
FIG. 3B is a detailed circuit diagram of a portion of the control system of FIG. 2.

As is shown on FIG. 3A, the angle detector 11 may be constituted by a variable capacitor 20 which includes two parallel sector-shaped metal plates 21a and 21b acting as parallel electrodes of the capacitor. It will be appreciated that the capacitance of capacitor 20 may be varied by changing the areas of metal plates 21a and 21b which are in overlapping relation. In order to make the overlapping of plates 21a and 21b dependent on the angular positioning of tone arm 4 relative to the path of movement of support 6 on feeding screw 7, plate 21a may be suitably coupled to a shaft 22a which is rotatable in a sleeve bearing 22b secured to plate 21b, and either the shaft 22a or the bearing sleeve 22b may be coupled to the tone arm 4 while the bearing sleeve or shaft, respectively, is coupled to the support bearing 5. Thus, the relative positions of plates 21a and 21b, and hence the capacitance of capacitor 20, is made to vary with the angular deviation $\Delta\theta$ of tone arm 4 from its predetermined angular position shown in full lines on FIG. 1. In the case where the angle detector 11 is constituted by the variable capacitor 20, such variable capacitor 20 may be included in a CR time-constant circuit 23 for the variable oscillator 12, as shown in FIG. 3B, so that the oscillation frequency of oscillator 12 is varied in response to changes in the capacitance of capacitor 20 with deviations of the tone arm from its predetermined angular position.

Figure 4:
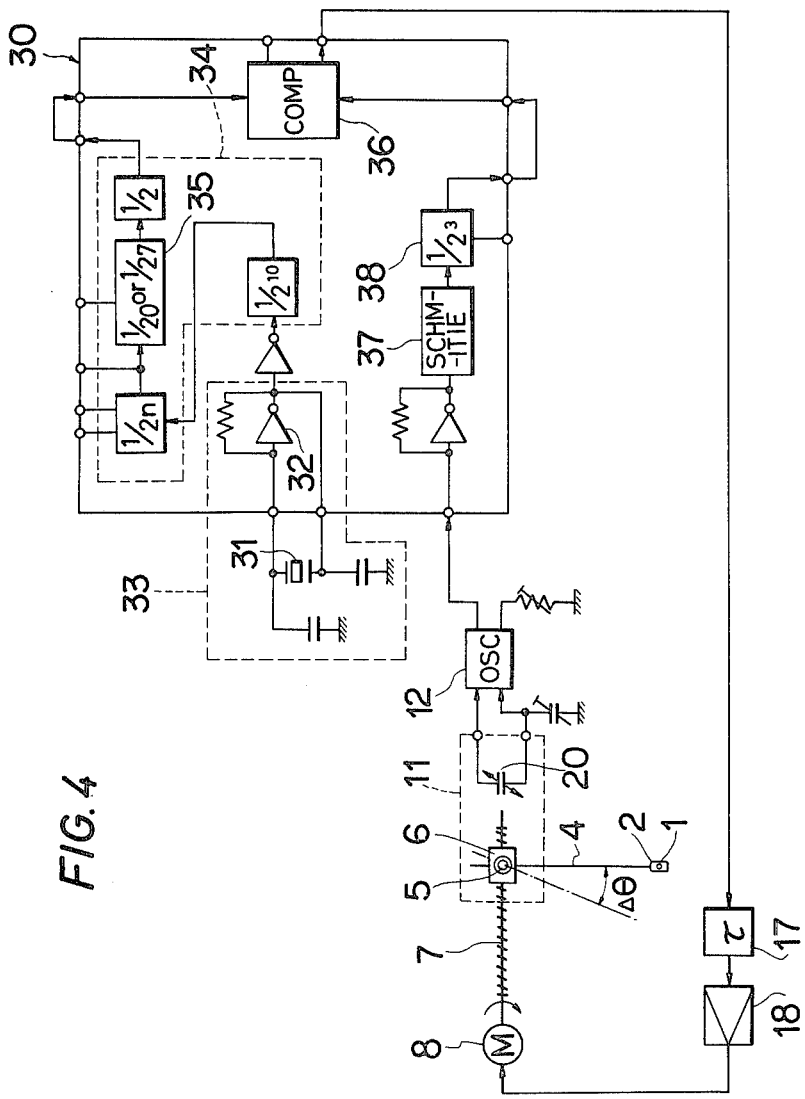
FIG. 4 is a block diagram showing further details of the control system of FIG. 2.

The linear tracking control system according to this invention may be advantageously composed of commercially available PLL integrated circuits. For example, as shown on FIG. 4, a record player with a linear tracking tone arm and a PLL control system in accordance with the present invention may include a commercially available PLL integrated circuit 30 in addition to other components which correspond to components described above with reference to FIGS. 1, 2, 3A and 3B and are identified by the same reference numerals. More particularly, in the tracking control system of FIG. 4, a quartz oscillating element 30 and associated capacitors external of the PLL-IC 30 and an inverting amplifier 32 included in the PLL-IC 30 cooperate to provide a reference oscillator 33 which replaces the oscillator 15 on FIG. 2 and which has a high degree of frequency stability. The PLL-IC 30 is further shown to include a frequency divider 34 which receives the output of reference oscillator 33 and which is composed of a number of frequency-dividing circuits having different respective frequency-dividing ratios, for example, as indicated at "$\frac{1}{2}n$", and also a programmable divider 35 which, in the case of the control system shown on FIG. 4, may not be utilized. A reference signal from frequency divider 34 is delivered to one input of a phase comparator 36 which is also included in the PLL-IC 30. The PLL-IC 30 is further shown to include a Schmidt circuit 37 for wave-shaping the output of oscillator 12 which has its frequency varied with the angular deviation $\Delta\theta$ of tone arm 4 from its predetermined angular position, and a frequency divider 38 which frequency-divides the wave-shaped signal from Schmidt circuit 37 for application to another input of phase comparator 36. It will be appreciated that, in the tracking control system of FIG. 4, the reference oscillator 33, frequency divider 34, phase comparator 36 and frequency divider 38 functionally correspond to the reference oscillator 15, frequency divider 16, phase comparator 14 and frequency divider 13, respectively, on FIG. 2. Furthermore, the operation of the tracking control system of FIG. 4 is generally similar to the previously described operation of the control system of FIG. 2.

Figure 5:
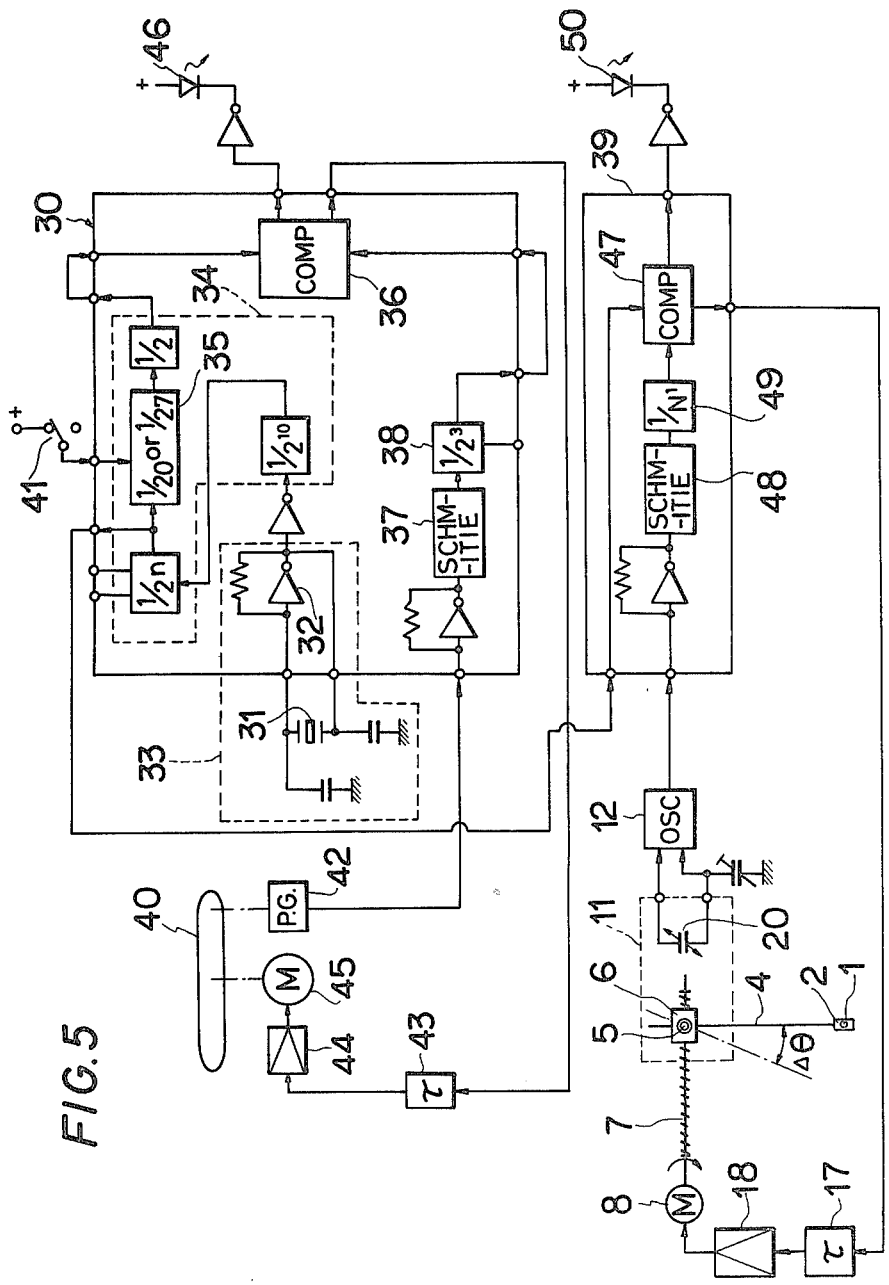
FIG. 5 is a block diagram illustrating a tracking control system for a record player with a linear tracking tone arm in accordance with another embodiment of this invention.

Referring now to FIG. 5, it will be seen that the PLL-IC 30 together with the reference oscillator 33 and an additional IC 39 can be employed in a record player according to this invention for controlling the rotational speed of the turntable and the linear tracking by the tone arm. More particularly, in the record player illustrated schematically on FIG. 5, the PLL-IC 30 is included in the circuit for controlling the rotational speed of the turntable 40, and a switch 41 is connected with the programmable divider 35 in frequency divider 34 so that a suitable frequency-dividing ratio, for example, of 1/20 or 1/27, may be selected by changing over switch 41 for obtaining a desired turntable speed of, for example, 45 or 33 r.p.m.

In order to maintain the rotational speed of turntable 40 at the desired value, a pulse generator 42 is associated with turntable 40 for detecting the rotation of the latter and generating a pulse or signal having a frequency corresponding to the speed of rotation of the turntable. The pulse or signal from generator 42 is supplied to phase comparator 36 by way of Schmidt circuit 37 and frequency divider 38, while the other input of comparator 36 receives the reference signal which is obtained by the selected frequency dividing, in frequency divider 34, of the output of reference oscillator 33. The resulting comparison signal from comparator 36 is applied by way of a loop filter 43 to a motor drive circuit 44 by which the motor 45 for driving turntable 40 has its speed controlled. A luminescent diode 46 may also receive an output from phase comparator 36 so as to be illuminated when the PLL control system is in its locked condition, that is, when the output of comparator 36 indicates that the rotational speed of turntable 40 is at its desired value.

For controlling the linear tracking by tone arm 4, the IC 39 is shown to include a phase comparator 47 which, at one of its inputs, receives a reference signal from a selected one of the frequency-dividing circuits (for example, the circuit having a frequency dividing ratio indicated as $\frac{1}{2}n$) in frequency divider 34 of PLL-IC 30. Since such reference signal is obtained by frequency-dividing the output of reference oscillator 33 which includes the quartz oscillating element 31, high stability of frequency is achieved. The signal to be compared in comparator 47 with the reference signal from frequency divider 34 is obtained from variable frequency oscillator 12 by way of a wave-shaping Schmidt circuit 48 and a frequency divider 49 included in IC circuit 39. The comparison signal from comparator 47 is supplied through loop filter 17 to motor drive circuit 18 so that the speed of servo motor 8 is again controlled for maintaining tone arm 4 in its predetermined angular position. The output of comparator 47 is further applied to a luminescent diode 50 which is illuminated to indicate the locked condition of the PLL-linear tracking control system when the output from comparator 47 indicates that tone arm 4 is in the predetermined angular position relative to the path of movement of tone arm support 5 on feeding screw 7.

Figure 6:
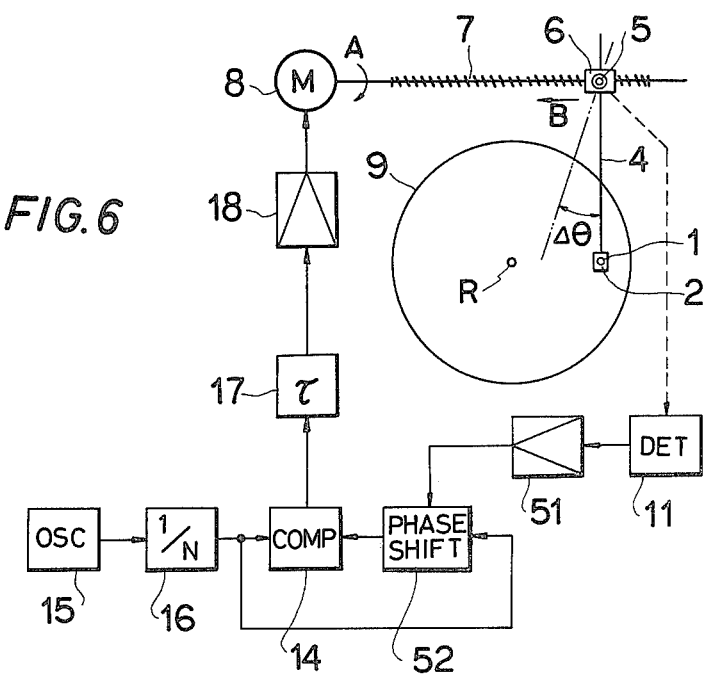
FIG. 6 is a block diagram showing a tracking control system for a record player with a linear tracking tone arm in accordance with still another embodiment of this invention.

Referring now to FIG. 6, in which components of a record player corresponding to components of the previously described embodiments are identified by the same reference numerals, it will be seen that an angle detection signal from angle detector 11 is there amplified in an amplifier 51 and then applied to a phase shifter 52 for correspondingly varying or shifting the phase of the reference signal applied to phase shifter 52 from frequency divider 16. Thus, the output of phase shifter 52 will have the same frequency as the reference signal obtained by way of frequency divider 16 from reference oscillator 15, but with the phase of the output from phase shifter 52 being shifted relative to the reference signal by an amount corresponding to the angular deviation $\Delta\theta$ of tone arm 4 from its predetermined angular position. In the embodiment of FIG. 6, the phase comparator 14 compares the phase of the reference signal with the phase of the output signal from phase shifter 52 and delivers a voltage signal corresponding to the phase difference between the compared signals and which is used to control motor 8. Apart from the foregoing, the circuit arrangement shown on FIG. 6 operates in a manner similar to that described above with reference to the embodiment of FIG. 2. However, the circuit arrangement of FIG. 6 is advantageously simple in that only a single reference oscillator 15 is required, as distinguished from the two oscillators 12 and 15 used in FIG. 2 or the two oscillators 12 and 33 used in FIGS. 4 and 5.

It will be apparent that, in all of the above described embodiments of the invention, there are provided a tone arm 4 having a reproducing stylus depending therefrom for movement linearly along a radius X of the record disc 9, a feeding device including a feeding screw 7 and servo motor 8 adapted to shift the tone arm support 6 in the direction of the arrow B parallel to the radius X, an angle detector 11 for detecting the angular deviation or displacement $\Delta\theta$ of the tone arm in the direction of the arrow C from the predetermined angular position of the tone arm, and which results from a lack of coincidence of the feeding speed of the tone arm support 6 by motor 8 with the speed at which the stylus 1 is moved radially inward by engagement with the record groove, means, such as, the variable frequency oscillator 12 or the phase shifter 52, for providing a periodic signal having an angular characteristic, that is, its frequency or phase, respectively, varied in response to the angle detection signal from angle detector 11, a reference oscillator 15 or 33 for generating the reference signal of fixed or standardized frequency or phase, and a phase comparator 14, 36 or 47 for comparing the frequency or phase of the periodic signal with that of the reference signal and providing a corresponding comparison or output signal for controlling the speed of rotation of motor 8 in the sense that the angular deviation $\Delta\theta$ of the tone arm from a predetermined angular position may be either maintained constant or eliminated. It will be apparent that the foregoing control system according to this invention establishes a phase-locked loop (PLL), whereby to effect stable and accurate linear tracking control of the tone arm, as is characteristic of phase locked loop controls. Further, the linear tracking control system according to this invention may be composed of PLL-ICs which are commercially available at relatively low cost at the present time, so that the overall cost of the record player may be substantially reduced. It will also be appreciated that, when a quartz oscillating element is included in the reference oscillator 15 or 33 of the linear tracking control system according to this invention, such system is relatively free of variation in its temperature characteristic and provides improved stability.

Although the linear tracking control systems according to this invention have been described as varying the speed of rotation of feeding screw 7 in the direction of the arrow A, and thereby varying the speed of movement of the tone arm support member 6 in the direction of the arrow B, it will be appreciated that the elimination of an angular deviation of tone arm 4 from its predetermined angular position may be achieved by turning feeding screw 7 in the direction opposed to the arrow A. Further, in the illustrated embodiments, the feeding screw 7 is assumed to be rotatably mounted so as to be fixed in the axial direction, whereby internally threaded tone arm support member 6 moves axially relative to feeding screw 7 upon turning of the latter. However, it will be appreciated that other types of feeding devices can be employed for displacing the tone arm support member 6 in the direction parallel to the radius X of the record disc. Thus, for example, tone arm support member 6 may be rotatably coupled to feeding screw 7 so as to be axially fixed relative to the latter, while the feeding screw 7 is threaded through a fixed, internally threaded bearing block so that the screw 7 is bodily displaced in the axial direction in response to turning thereof. It is also to be appreciated that the record player according to this invention may be of the type for reproducing audio signals or video signals recorded on a record disc.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A record player comprising:
   a turntable rotatable about a central axis and being adapted to support a record disc concentric with said axis;
   a tone arm support means;
   feeding means engaged with said tone arm support means for moving the latter in a path which is in parallel, spaced relation to a radius of said turntable;
   a tone arm mounted on said support means for angular displacement from a predetermined angular relationship to said path;
   a pick-up cartridge mounted on said tone arm and having a reproducing stylus movable linearly along said radius in response to movement of said support means in said path with said tone arm in said predetermined angular relationship thereto;
   detecting means for detecting angular deviation of said tone arm from said predetermined angular relationship, including a variable capacitor having its capacitance varied in accordance with said angular deviation, said variable capacitor including a pair of sector-shaped plates respectively fixed relative to said tone arm and said support means so that the areas of said plates which overlap are changed in response to said angular displacement of the tone arm;
   variable oscillator means for providing a periodic signal having an angular characteristic varied in response to detection of said angular deviation by said detecting means;

reference signal generating means for generating a reference signal with said angular characteristic thereof being standardized, said generating means including an oscillation circuit;

comparator means for comparing said angular characteristics of the periodic signal and the reference signal, respectively, and providing a corresponding control signal; and means for varying the speed of movement of said tone arm support means by said feeding means in response to said control signal so as to eliminate any deviation of said tone arm from said predetermined angular relationship and thereby ensure linear movement of said stylus along said radius.

2. A record player according to claim 1; in which said angular characteristic of the periodic signal is the frequency thereof.

3. A record player according to claim 1; in which said angular characteristic of the periodic signal is the phase thereof.

4. A record player according to claim 1; further comprising a motor for driving said turntable; turntable-rotation detecting means for generating a signal having a frequency corresponding to the rotational speed of the turntable; second comparator means for comparing the frequency of said signal from the turntable -rotation detecting means with the frequency of a reference signal from said reference signal generating means to provide a comparison signal; and loop means for maintaining constant the speed of said motor in response to said comparison signal.

5. A record player according to claim 1; in which said feeding means includes a rotatable feed screw rotatable about its longitudinal axis which is parallel with said path, and a controllable motor for rotating said feed screw; and said tone arm support means includes a support member with a threaded bore extending therethrough and receiving said feed screw, and a bearing mounting said tone arm on said support member and permitting said angular displacement of the tone arm about an axis parallel with said central axis of the turntable.

6. A record player comprising:

a turntable rotatable about a central axis and being adapted to support a record disc concentric with said axis;

tone arm support means;

feeding means engaged with said tone arm support means for moving the latter in a path which is in parallel, spaced relation to a radius of said turntable;

a tone arm mounted on said support means for angular displacement from a predetermined angular relationship to said path;

a pick-up cartridge mounted on said tone arm and having a reproducing stylus movable linearly along said radius in response to movement of said support means in said path with said tone arm in said predetermined angular relationship thereto;

detecting means for detecting angular deviation of said tone arm from said predetermined angular relationship, including a variable capacitor having its capacitance varied in accordance with said angular deviation said variable capacitor including a pair of sector-shaped plates respectively fixed relative to said tone arm and said support means so that the areas of said plates which overlap are changed in response to said angular displacement of the tone arm;

means including a variable frequency oscillator controlled by said detecting means for providing a periodic signal having an angular characteristic varied in accordance with said angular deviation detected by said detecting means;

reference signal generating means for generating a reference signal with said angular characteristic thereof being standardized, said generating means including an oscillation circuit having a quartz oscillating element, and a frequency dividing means for frequency dividing the output of said oscillator circuit;

comparator means for comparing said angular characteristics of the periodic signal and the reference signal, respectively, and providing a corresponding control signal; and means for varying the speed of movement of said tone arm support means by said feeding means in response to said control signal so as to eliminate any deviation of said tone arm from said predetermined angular relationship and thereby ensure linear movement of said stylus along said radius.

* * * * *